July 23, 1968

H. FASTE 3,393,997

METHOD FOR METALLURGICAL TREATMENT OF MOLTEN
METAL, PARTICULARLY IRON

Filed July 6, 1966

July 23, 1968
H. FASTE
3,393,997
METHOD FOR METALLURGICAL TREATMENT OF MOLTEN
METAL, PARTICULARLY IRON
Filed July 6, 1966
2 Sheets-Sheet 2
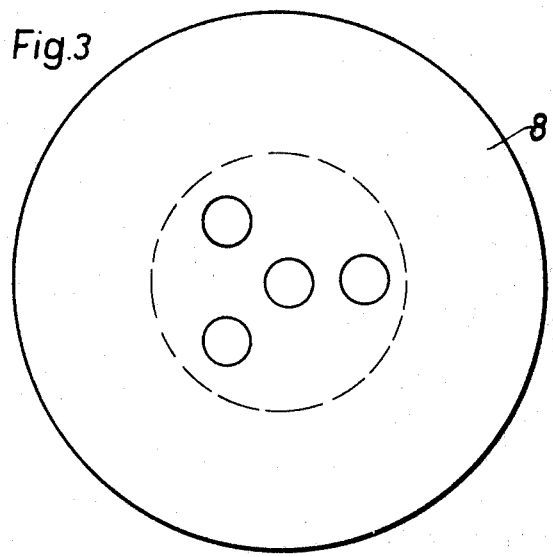
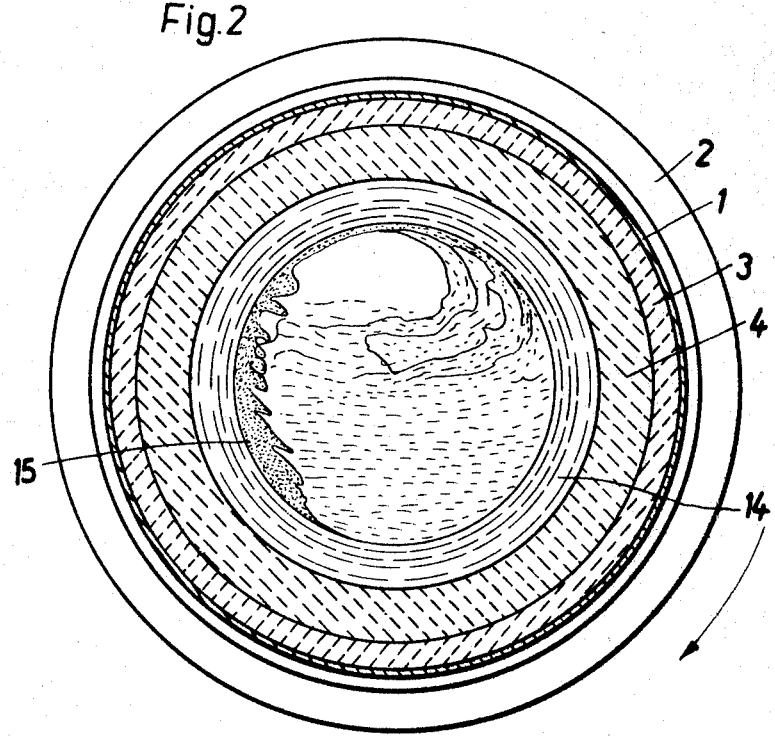

United States Patent Office 3,393,997
Patented July 23, 1968

3,393,997
METHOD FOR METALLURGICAL TREATMENT OF MOLTEN METAL, PARTICULARLY IRON
Heinrich Faste, Bremen, Germany, assignor to Friedrich Kocks, Dusseldorf, Germany
Filed July 6, 1966, Ser. No. 563,106
Claims priority, application Germany, July 10, 1965, K 56,588
7 Claims. (Cl. 75—59)

The metallurgical treatment of molten metal, particularly iron, is preferably effected in stationary vessels, for example Siemens-Martin furnaces, electrical furnaces or converters. With the exception of the refining treatment in a converter, in which oxygen is blown onto or through the molten metal, the melt in the conventional processes is always at rest. The metallurgical reactions in each case, however, depend decisively upon the contact surface between the molten metal and the gaseous or solid treating media.

According to a known method, the reaction is to be accelerated by charging ore into a slowly rotating drum which contains molten raw iron and in which the ore is reduced. The content of the drum is entrained by the upwardly moving portion of the drum wall a distance depending upon the rotational speed of the drum, and is thus thoroughly mixed. A disadvantage of this known method is the extremely intensive frictional wear of the refractory drum lining which must be replaced after a relatively short time of operation.

For minimizing the attack of aggressive slags, such as thinly liquid slags rich in ferrous oxide, upon the masonry or lining of the drum, it has also been proposed that a refractorily lined drum furnace containing liquid iron be operated at such a high rotating speed that the iron is caused by centrifugal force to form a rotational cylinder which covers the masonry and protects it from attack by slag. The slag resulting from the metallurgical treatment of the iron, having a lower specific gravity, then forms a layer floating upon the inner surface of the rotating cylinder formed by the molten iron.

In a more particular aspect, my invention relates to a method of the just-mentioned type, according to which a centrifugating drum lined with refractory masonry and having confining walls at its axial ends, is kept in rotation at high speed about a horizontal axis or about an axis of slight inclination toward the horizontal, in order to obtain a reaction of liquid metal with processing agents.

It is an object of the invention to modify and improve such a metal processing method in such a manner as to increase the contacting surface between the reaction partners, preferably up to the attainable maximum.

To this end, and in accordance with the invention, the metal melt is completely or partially dispersed into droplets and these are intimately mixed with the treating agents.

More specifically, according to another feature of my invention, the metal melt and the treating agents are charged into the drum, and the drum is then rotated at such a high speed that the metal forms a rotational cylinder on the masonry lining of the drum, the slag as well as the treating agents of lower specific gravity then floating on the inner surface of the cylinder. After the rotational cylinder has thus been formed upon the drum masonry, the rotational speed of the drum is reduced to a value at which the centrifugal force acting upon the melt at the apex of the rotational cylinder no longer suffices to overcome the gravity acting upon the metal at this point. This produces a shower of metal which can be subjected to the influence of solid, liquid and/or gaseous processing agents continuously or discontinuously fed into the free inner space of the rotating drum. The drum may be inclined relative to the horizontal, and the melt may also be passed through the centrifugal drum in counterflow to the reaction agents or to a partial quantity thereof. Furthermore, the drum may be subdivided into individual reaction zones. This can be done by supplying the processing agents at respectively different distances from the axial end sides of the drum.

The invention will be further described with reference to an embodiment of a device for performing the method illustrated by way of example on the accompanying drawings in which:

FIG. 2 is a diametrical section through the same device, the section being along the line II—II in FIG. 1; and FIG. 3 is a side elevation showing the front plate of the centrifugal drum according to FIG. 1.

Figure 1:
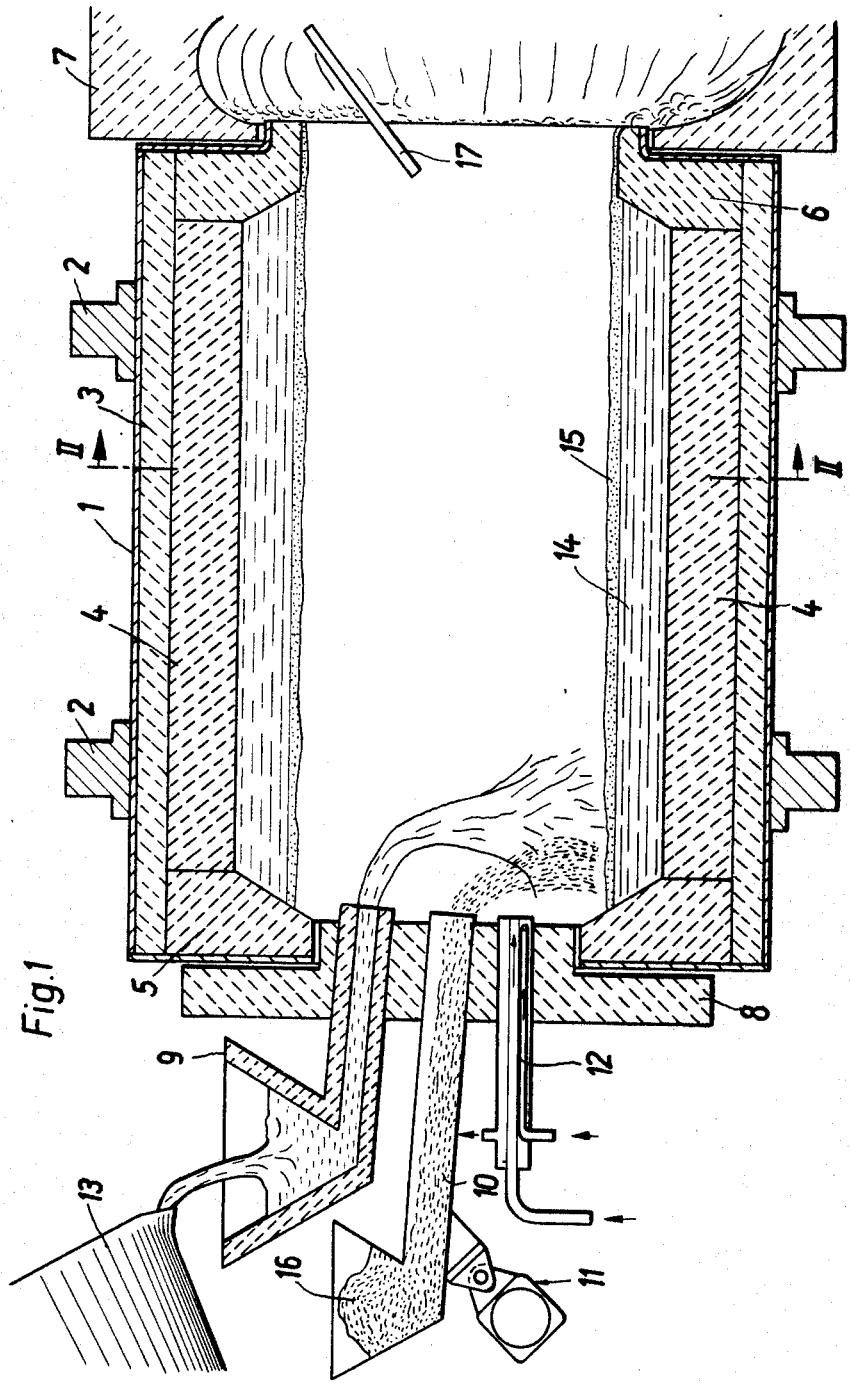
FIG. 1 is an axial section through a centrifugal drum during a first or starting-up phase of the method.

The drum comprises a steel jacket 1 equipped with coaxial rolling rings 2 by means of which the drum is placed in rotation with the aid of a suitable drive (not illustrated). The steel jacket 1 is lined with refractory material 3, 4. At the feeder side of the drum, the diameter of its inner space is reduced by means of a damstone 5. Another damstone 6 of annular shape is located at the opposite axial end of the drum and has an inner diameter larger than that of the damstone 5. The centrifugal drum is located closely ahead of a collecting furnace 7 which receives the metal and slag leaving the drum by overflowing the damstone 6.

The feed opening of the drum is covered by a front plate 8 which has a number of openings for respective feeder members. Thus, the outlet end of a feeder funnel 9 for supplying the molten metal passes through the front plate 8. A vibrating trough 10 driven by a vibrator 11, as well as a double lance 12 for gaseous and/or liquid treating agents also pass through the front plate 8.

The method according to the invention is performed as follows. First, the metal to be treated is charged from a sump of liquid metal in a ladle 13 through a funnel 9 into the drum which is then placed in rotation. Now a rotational cylinder 14 is formed of the melt upon the inner surface of the drum. To the extent any slags and/or treating agents of lower specific gravity enter also into the rotating drum, they form an inner layer 15 floating upon the rotational cylinder of metal. As soon as the two rotational cylinders 14 and 15 are formed, the speed of the drum is reduced to such an extent that the two-layer cylinder of melt 14 and slag 15 will just remain preserved. Thereafter, a further quantity of molten metal is supplied into the drum, as well as a further amount of processing agents 16 which pass over the shaker trough 10 into the drum interior.

The additional supply of molten metal and treating agents reduces the inner diameter of the liquid rotational cylinder 14, 15 so that its inner surface commences to grow into a range of radii where the effect of gravity exceeds the centrifugal force acting upon each partial region of the melt. Consequently, at the apex of the rotational cylinder 14, 15, just as much molten material will become separated and will be caused by gravity to drop, as is necessary for increasing the inner width of the rotational cylinder to a radius at which the vertical component of gravity and the centrifugal force are just equal to each other. By maintaining the rotational speed constant and supplying a constant quantity of molten metal, the total quantity of molten droplets falling through the free inner space of the drum can be controlled.

The region where the melt will thus be dripping off need not be exclusively limited to the apex of the rotating cylinder 14, 15. By correspondingly reducing the rotary speed or by increasing the supply of material, this region can be changed to cover a larger or smaller circular arc.

The size of the portion of the cylinder 14, 15 thus constituting the dripping region is in each case determined by the amount by which gravity exceeds the centrifugal force.

During free fall through the free inner space of the centrifugating drum, the individual droplets of molten metal are in contact along a relatively long distance with the treating agents filling the free inner space. By virtue of the resulting large phase boundary surfaces and the slight diameter of the individual droplets, the latter being important to the reaction or diffusion, a very good reaction of the melt with the treating agents is secured. The treating agents in gaseous form may fill the entire free space within the centrifugal drum, or, depending upon the specific gravity, they may form an expansive layer of larger or smaller thickness upon the lower portion of the rotational cylinder 14, 15. The treated melt and the slag leave the drum by overflowing the damstone 6 in accordance with the quantity being supplied at the feeder side, and then reach the collecting furnace which serves as collecting vessel or also for aftertreatment of the melt. The double lance 12 for liquid and/or gasous treating agents may also be situated at the outlet end of the drum to thus obtain a reaction with the melt in counterflow relation to its passage through the drum.

With the aid of equipment as shown on the drawing, the method according to the invention was tested as follows. Liquid pig iron was refined to steel in a centrifugal drum of 3.5 m. length having an inner diameter of 0.7 m. During the above-described performance of the method, the rotating speed of the drum was initially 150 r.p.m., while iron was fed into the drum through a trough in a quantity of about 10 metric tons per hour. After a quantity of 2.7 t. was supplied the speed was reduced to 90 r.p.m., at which speed the above-described shower of droplets was formed. Now, a quantity of oxygen in 90% concentration was continuously supplied in a quantity of 580 Nm.$^3$/h., further 670 kg./h. limestone and 580 kg./h. iron ore containing 61% Fe. The flow velocity of oxygen into the drum was approximately 1 m./sec. The iron was fed into the drum at a temperature of 1295° C. and contained 3.85% carbon, 0.64% silicon, 0.78% manganese, 0.11% phosphorus and 0.081% sulfur. The steel flowing over the damstone at the end of the drum into the collecting chamber contained 0.15% carbon, 0.59% manganese, 0.012% phosphorus and 0.029% sulfur. The hot furnace gases, having a temperature above 1750° C., were passed into the collecting chamber for heating it. The steel was drawn from the collecting chamber at a temperature of 1610° C. in a quantity of 9270 kg./h. The quantity of slag was 1185 kg./h.

As is manifested by the above-described example, the method of the invention is particularly well suitable for refining of liquid raw iron. The carbon monoxide evolving from the combustion of the carbon then contributes to separating the droplets of molten metal and slag from the rotational cylinder. Subsequently the carbon monoxide is combusted in the free space of the centrifugal drum.

The melt may be deoxidized, for example, by feeding a pre-deoxidation medium through the vibrating trough 10 into the front portion of the drum and blowing the residual deoxidation agent with the aid of a carrier gas through the lance 17 into the drum so that it reaches approximately the last third of the interior drum space.

Aside from refining iron to steel, the invention is also applicable for the degassing of metal melts. The good degassing action is due to the fact that the individual drops of molten material, during free fall through the inner space of the centrifugal drum, are degassed in accordance with the partial pressure of the dissolved gases in the two phases (gas/metal). The degasification is extremely good on account of the large phase boundary surface and can be further improved by increasing the concentration gradient, for example by introducing a particularly pure rinsing gas.

For example, steel was continuously supplied through the feeder funnel 9 into the melt contained in the drum. First a rotational cylinder was produced in the manner described above, and the speed was then set to the value at which a portion of the steel always showered in form of droplets through the free inner space. Pulverulent reduction carbon was supplied through the vibrating trough 10 into the interior of the drum and argon was blown through the lance 17 into the space near the outlet end of the drum, so that the argon flow was directed against the flow of the steel through the drum and left the drum through a gas outlet in the front plate 8. Since the degasification took place in counterflow, the argon consumption was much smaller than in the known methods according to which rinsing gas is passed through a stationary melt. A further saving resulted from the fact that the carbon monoxide evolving from the carbon in the front portion of the drum on account of the deoxidation, also acted as a rinsing gas and thus resulted in reducing the gas content of the melt.

Aside from removing gases, impurities and deoxidation products from the melt, the method of the invention also permits the desulfurizing of steel. This is done, for example, by blowing the desulfurizing agent in finely dispersed form together with a carrier or rinsing gas into the interior of the drum. The removal of sulfur from the melt is very effective because of the above-mentioned large phase boundary surface of the drops relative to the mass of the metal.

The treatment of a melt according to the invention may also be effected in different reaction zones. The position of the reaction zones is then determined by the feeder points at which the individual treating agents are supplied relative to the longitudinal axis of the drum and/or by the provision of ring-shaped partitions in the interior of the drum. The radial heights of the ring-shaped partitions are preferably so chosen that a damming up of the melt toward the feeder side is prevented; and the heights of the respective partitions may be different from each other.

The method of the invention is further well suitable for the deoxidation of copper. For this purpose, reducing gases, for example methane, are passed through the drum in counterflow to the copper melt. It is important in each case that the melt be dispersed into individual particles or droplets which have a large phase boundary surface, and that the droplets of molten material will pass through a longest feasible distance or as frequently as feasible during their free fall in contact with the treating agents.

To those skilled in the art it will be obvious upon a study of this disclosure that my invention permits of various modifications, especially as regards the equipment used for performing the method, and may be given embodiments other than particularly illustrated and described herein, without departing from the essential features of my invention and within the scope of the claims annexed hereto.

I claim:

1. The method of metallurgically treating molten metal in a centrifugal drum rotatable about a horizontal or inclined axis, which comprises the steps of charging the drum with the molten metal and rotating the drum at centrifugal speed so as to form on the inner periphery of the drum a hollow rotational cylinder of molten metal, then reducing the drum rotation to a speed at which gravity predominates over centrifugal force in an apex region of the metal cylinder so that a shower of molten droplets falls through the inner space of the cylinder, and subjecting the shower of droplets in said inner space to contact with treating agent.

2. The method according to claim 1, which comprises feeding additional metal into the drum at one axial end thereof and discharging the treated metal at the other, and supplying at least part of the treating agents into the drum in counterflow direction to the passage of the metal.

3. The method according to claim 1, which comprises supplying the treating agents to the drum inner space at respectively different distances from one end of the drum.

4. The method according to claim 1, wherein said metal is iron and said agents comprise oxygen for converting the iron to steel.

5. The method according to claim 1, wherein said agents comprise a deoxidizing medium.

6. The method according to claim 1, wherein said agents comprise a desulfurizing medium.

7. The method according to claim 1, wherein said metal is copper and said agents comprise a gaseous deoxidizing medium.

No references cited.

BENJAMIN HENKIN, *Primary Examiner*.